United States Patent [19]  
Kozawa et al.

[11] 4,342,840  
[45] Aug. 3, 1982

[54] PROCESS FOR PRODUCING POLYMER POLYOL

[75] Inventors: Shigeyuki Kozawa, Yokohama; Takao Doi, Kawasaki; Nobuaki Kunii, Yokohama, all of Japan

[73] Assignee: Asahi Glass Company, Ltd., Tokyo, Japan

[21] Appl. No.: 214,283

[22] Filed: Dec. 8, 1980

[30] Foreign Application Priority Data

Dec. 25, 1979 [JP] Japan ................................. 54-167665  
Dec. 28, 1979 [JP] Japan ................................. 54-170325

[51] Int. Cl.³ ..................... C08G 18/14; C08G 18/63; C07C 125/06
[52] U.S. Cl. ..................................... 521/137; 528/75; 560/26; 524/850
[58] Field of Search ......................... 521/137; 528/75; 260/32.4

[56] References Cited

U.S. PATENT DOCUMENTS

| | | | |
|---|---|---|---|
| 3,383,351 | 5/1968 | Stamberger | 260/33.2 |
| 3,523,093 | 8/1970 | Stamberger | 260/2.5 |
| 3,652,639 | 3/1972 | Pizzini et al. | 260/465.4 |
| 3,655,553 | 4/1972 | DeWald | 252/1 |
| 3,823,201 | 7/1974 | Pizzini et al. | 260/861 |
| 3,966,521 | 6/1976 | Patton et al. | 156/78 |
| 3,968,089 | 7/1976 | Cuscurida et al. | 260/859 R |
| 4,018,851 | 4/1977 | Baccei | 260/859 R |
| 4,032,485 | 6/1977 | Onoda et al. | 521/129 |
| 4,161,468 | 7/1979 | Davis et al. | 260/30.4 R |
| 4,283,500 | 8/1981 | Armstrong et al. | 521/137 |

FOREIGN PATENT DOCUMENTS 48-102897 12/1973 Japan .  
49-42790 4/1974 Japan .  
49-47488 5/1974 .  
50-59497 5/1975 Japan .  
53-7474 3/1978 Japan .  
54-33586 3/1979 Japan .  
54-36390 3/1979 Japan .  
54-69200 6/1979 Japan .  
1040452 8/1966 United Kingdom .

Primary Examiner—H. S. Cockeram  
Attorney, Agent, or Firm—Oblon, Fisher, Spivak, McClelland & Maier

[57] ABSTRACT

A polymer polyol is produced by polymerizing a monomer having a polymerizable unsaturated group in a nitrogen bond-containing unsaturated polyol or polyol mixture having at least two nitrogen-containing bonds formed by reacting isocyanate groups with active hydrogen groups, at least one polymerizable unsaturated group and at least 1.7 hydroxyl groups, as average.

A polymer polyol is produced by polymerizing a monomer having a polymerizable unsaturated group in a nitrogen bond-containing unsaturated polyol or polyol mixture having at least 1.7 hydroxyl groups as average obtained by reacting a polyisocyanate with a mixture of a substantially saturated polyol having at least two hydroxyl groups and an unsaturated active hydrogen compound having at least one active hydrogen group and at least one polymerizable unsaturated group or by reacting said polyisocyanate with either of said substantially saturated polyol or said unsaturated active hydrogen compound and then reacting the remainder with the intermediate; or a polyol mixture obtained by diluting said nitrogen bond-containing unsaturated polyol or polyol mixture with a substantially saturated polyol.

25 Claims, No Drawings

PROCESS FOR PRODUCING POLYMER POLYOL

BACKGROUND OF THE INVENTION

1. Field of the Invention

The present invention relates to a process for producing a polymer polyol and a polyurethane obtained by using the polymer polyol. More particularly, it relates to a process for producing a polymer polyol by polymerizing a monomer having a polymerizable unsaturated group in a specific polyol having a polymerizable unsaturated group and a process for producing a polyurethane obtained by using the polymer polyol.

2. Description of the Prior Art

A compound obtained by polymerizing a monomer having a polymerizable unsaturated group in a polyol such as a polyether polyol or a polyester polyol or a mixture thereof is referred to as a polymer polyol. A polymer polyol is used as a starting material for polyurethane foams and polyurethane elastomers. The polymer polyols are classified into two groups. One kind of polymer polyols are obtained by polymerizing a monomer in a polyol having substantially no polymerizable unsaturated group. The polymer polyols in this group are disclosed in U.S. Pat. No. 3,383,351, No. 3,523,093 and British Pat. No. 1,040,452.

The other kind of polymer polyols are obtained by polymerizing a monomer in polyol having a polymerizable unsaturated group. In view of dispersion stability, the latter polymer polyols are considered to be superior, however, in view of easy production and economical consideration, the latter polymer polyols have not been satisfactory.

The present invention relates to the latter polymer polyols.

The polymer polyols obtained by polymerizing a monomer having a polymerizable unsaturated group (referring to as monomer) in a polyol having a polymerizable unsaturated group (referring to as unsaturated polyol) are disclosed in U.S. Pat. No. 3,652,639, No. 3,823,201, No. 3,966,521 and No. 4,032,485.

In these prior arts, the unsaturated polyols are produced by reacting a saturated polyol with an unsaturated polycarboxylic acid such as maleic anhydride, and then, reacting an alkylene oxide; or by reacting an unsaturated epoxide such as allyl glycidyl ether with a saturated polyol. However, when the unsaturated acid is used, the unreacted carboxylic acid group is usually remains or the ester of the unsaturated polyol is easily decomposed in the production of a polymer polyol, to form carboxylic acid group, whereby polymer polyols having high acid value is disadvantageously obtained. The use of the polymer polyol having high acid value in a the production of a polyurethane causes trouble in the reaction for urethane bond, whereby a desired polyurethane can not be obtained. From the technological and economical viewpoints, the known unsaturated polyols are not satisfactory for the production of polyurethanes.

SUMMARY OF THE INVENTION

It is an object of the present invention to provide a process for producing a polymer polyol by using a stable unsaturated polyol obtained by an easy process.

It is another object of the present invention to provide a process for producing a stable polymer polyol which is stable to prevent a phase separation.

It is the other object of the present invention to provide a polymer polyol for producing a polyurethane foam which is relatively harder than the polyurethane foam obtained by using the conventional polymer polyol.

The foregoing and other objects of the present invention have been attained by producing a polymer polyol by polymerizing a monomer having a polymerizable unsaturated group, in an unsaturated polyol having a nitrogen-containing bond such as urethane bond, urea bond or the other nitrogen-containing bond formed by reacting an isocyanate group with active hydrogen group or in a polyol mixture including the unsaturated polyol.

DETAILED DESCRIPTION OF THE PREFERRED EMBODIMENTS

The unsaturated polyol having a nitrogen-containing bond is referred to as "NB-unsaturated polyol". The unsaturated active hydrogen compound is referred to as "unsaturated AH". The substantially saturated polyol is referred to as "saturated polyol".

The mixture of the NB-unsaturated polyol and another polyol is referred to as a polymer mixture including NB-unsaturated polyol.

The NB-unsaturated polyol (or the polyol mixture including the NB-unsaturated polyol) can be obtained by reacting a polyisocyanate having at least two isocyanate groups with a saturated polyol having at least two hydroxyl groups and an unsaturated AH having at least one active hydrogen group and at least one polymerizable unsaturated group. The NB-unsaturated polyol can be also obtained by reacting a polyisocyanate having at least two isocyanate groups with either the saturated polyol or the unsaturated AH and then, reacting the product having at least one isocyanate group with the other one of the saturated polyol or the unsaturated AH. The resulting unsaturated polyol or mixture thereof should have at least 1.7 of hydroxyl groups as average per one molecule of the polyol.

The polymer polyol is produced by polymerizing the monomer in the NB-unsaturated polyol or polyol mixture thereof. The NB-unsaturated polyol or polyol mixture thereof can be produced by the above-mentioned process. That is, the polymer polyol is produced by polymerizing the monomer having a polymerizable unsaturated group in the NB-unsaturated polyol having at least two nitrogen-containing bonds formed by the reaction of isocyanate groups and active hydrogen groups and at least one polymerizable unsaturated group and at least 1.7 of hydroxyl groups as average.

The polymer polyol can be also produced by polymerizing the monomer having a polymerizable unsaturated group in the NB-unsaturated polyol or polyol mixture thereof which is obtained by reacting a polyisocyanate having at least two isocyanate groups with a mixture of a saturated polyol having at least two hydroxyl groups and an unsaturated AH having at least one active hydrogen and at least one polymerizable unsaturated group so as to form a polyol having at least 1.7 of hydroxyl groups as average and a mixture thereof or by reacting the polyisocyanate with either of the saturated polyol or the unsaturated AH to form a compound having at least one isocyanate group and then reacting the compound with the remaining compound so as to form a polyol having at least 1.7 of hydroxyl groups as average or the mixture thereof, which can be further diluted with a saturated polyol.

The nitrogen-containing bond in the NB-unsaturated polyol is formed by the reaction of the isocyanate group with the active hydrogen group. The active hydrogen group can be hydroxyl group, amino group, carboxylic acid group, or —SH group and is preferably hydroxyl group. The nitrogen-containing bond (NB) can be urethane bond, urea bond, biuret bond, alloplanate bond etc. and preferably urethane bond or urea bond and is formed by the reaction of a polyisocyanate having at least two isocyanate groups with an active hydrogen compound having at least one active hydrogen group. Since the polyisocyanate is obtained, at least two nitrogen-containing bonds are formed. At least one polymerizable unsaturated group is needed and is a C—C double bond or a C—C triple bond. The unsaturated group is polymerizable if necessary with the other unsaturated group. The unsaturated group should be at least one of the polyisocyanate or the active hydrogen compound and usually it is in the active hydrogen compound. The example of the active hydrogen compound having a polymerizable unsaturated group is described, however, the unsaturated group can be included in the polyisocyanate. The NB-unsaturated polyol has 1.7 of hydroxyl groups as average. When the unsaturated active hydrogen compound has at least two hydroxyl groups, the NB-unsaturated polyol can be obtained from the unsaturated AH and polyisocyanate. When the unsaturated AH has not upto two hydroxyl groups, it is necessary to use a compound having at least two hydroxyl groups. It is also necessary to use the same when the NB-unsaturated polyol having high viscosity can not be obtained from only these compounds. Therefore, the NB-unsaturated polyol is produced from the unsaturated AH (hydroxyl group can be included), the saturated polyol and a polyisocyanate. The combinations of three starting materials can be not only one combination but can be two or more combinations.

The unsaturated AH is a compound having at least one active hydrogen group and at least one unsaturated group and is preferably an unsaturated hydroxy compound having at least one hydroxyl group.

The unsaturated hydroxy compound can be an unsaturated polyhydroxy compound and an unsaturated monohydroxy compound. The typical unsaturated polyhydroxy compounds are unsaturated polyols such as unsaturated polyhydric alcohols and unsaturated polyether polyols. In the specification, the latter unsaturated polyols are distinguished from the NB-unsaturated polyol, to be one of the former unsaturated polyhydric alcohols. The typical unsaturated monohydroxy compound can be unsaturated monohydric alcohol and can be considered to include the macromolecular unsaturated monools such as the unsaturated polyether monools. The other example of the unsaturated hydroxy compounds can be the unsaturated monophenols and the unsaturated polyphenols which have at least one phenolic hydroxyl group and a polymerizable unsaturated group.

The active hydrogen compounds beside the unsaturated hydroxy compounds can be compounds having at least one of carboxylic acid group, amino group, amide group or —SH group such as acrylic acid, methacrylic acid, crotonic acid, maleic acid, fumaric acid, itaconic acid, acrylamide, paravinyl aniline etc.

The unsaturated polyhydroxy compounds can be compounds having at least two hydroxyl groups and at least one unsaturated group such as unsaturated polyhydric alcohols and unsaturated polyhydric phenols and are preferably the unsaturated polyhydric alcohols. The unsaturated polyhydric alcohols include the conventional unsaturated polyhydric alcohols as well as the unsaturated polyether polyols, the unsaturated polyester polyols, and the unsaturated polyether-ester polyols which contain at least two hydroxyl groups. The unsaturated polyhydric alcohols in the narrow definition, include 2-butene-1,4-diol; 3-butene-1,2-diol; glycerol allyl ether; trimethylolpropane allyl ether; pentaerythritol vinyl ether; 2,5-dimethyl-3-hexene-2,5-diol; 1,5-hexadiene-3,4-diol; and 1,4-butinediol which are polyhydric alcohols having one or more unsaturated groups.

The unsaturated polyhydric alcohols in the broad definition include said unsaturated polyhydric alcohols in the narrow definition and the unsaturated polyether polyols as adducts of the unsaturated active hydrogen compounds having at least two active hydrogen groups with epoxides such as alkylene oxides; and unsaturated polyether polyols as adducts of the active hydrogen compound having at least two active hydrogen groups with an unsaturated epoxide such as allyl glycidyl ether, 1-vinyl cyclohexane-3,4-epoxide, butadiene monoepoxide if necessary with the other epoxide; unsaturated polyester polyol obtained from an unsaturated polybasic acid or a polybasic acid having at least one unsaturated polyhydric alcohol moiety (narrow definition) and a polyhydric alcohol; and unsaturated polyether-ester polyols obtained by reacting a polyol with the unsaturated polybasic acid and further reacting with an epoxide. The unsaturated polyhydric alcohols (broad definition) are not critical and can be the compound having at least two hydroxyl groups and at least one unsaturated group.

The unsaturated polyhydroxy compounds having at least two hydroxyl groups are preferably the unsaturated polyhydric alcohol (broad definition) (hereinafter referring to as unsaturated polyhydric alcohol) especially, the unsaturated polyhydric alcohols (narrow definition) especially, $C_3$–$C_{10}$ unsaturated polyhydric alcohols. Besides the unsaturated polyhydric alcohols (narrow definition), the unsaturated polyols having relatively low molecular weight are preferably used. The molecular weight is not critical, but is preferably less than 4,000 especially less than 3,000. The number of hydroxyl groups in the unsaturated polyhydroxy compound is in a range of 2 to 8 especially 2 to 4 especially 2. The number of the unsaturated group in one molecule is not critical, but is preferably in a range of 1 to 4 especially 1 to 2. The optimum unsaturated polyhydroxy compound is 3-butene-1,2-diol or 2-butene-1,4-diol.

The unsaturated monohydric alcohol is the compound having one hydroxyl group and at least one unsaturated group which is preferably a polymerizable double bond. Only one double bond is preferable. The hydroxyl group is alcoholic or phenolic hydroxyl group. The unsaturated monohydric alcohol can be various compounds such as unsaturated monools, monoesters of unsaturated carboxylic acid and diol; monoesters of diol and monocarboxylic acid, phenols having an alkenyl chain group and unsaturated polyether monools. The unsaturated monool is preferably a $C_3$–$C_6$ ethylenical alcohol such as allyl alcohol, 2-butene-1-ol, 3-butene-2-ol, 3-butene-1-ol, propargyl alcohol. The monoester of the unsaturated carboxylic acid and diol can be monoesters of the unsaturated carboxylic acid such as acrylic acid, methacrylic acid, crotonic acid etc. with a diol such as ethyleneglycol, propyleneglycol, butyleneglycol etc. such as 2-hydroxyethyl acrylate, 2-hydroxyethyl methacrylate, 2-hydroxypropyl acrylate, 2-hydroxypropyl methacrylate, 2-hydroxybutyl acrylate, 4-hydroxybutyl acrylate etc. The monoesters of the unsaturated diol and the monocarboxylic acid can be monoesters of butenediol. The phenols having an alkenyl chain group can be oxystyrene, hydroxy α-methylstyrene, etc. The other unsaturated monohydroxy compounds can be N-methylol acrylamides, monomethylaminoethyl methacrylate etc. The molecular weight is not critical and preferably less than 1,000 especially less than 500. The optical compounds are monoesters of acrylic acid or methacrylic acid with ethyleneglycol, propyleneglycol or butyleneglycol; or allyl alcohol or hydroxy α-methylstyrene.

The polyisocyanates are organic compounds having at least two isocyanate groups (—NCO) such as aromatic polyisocyanates, aliphatic polyisocyanates, alicyclic polyisocyanates, and others and preferably aromatic polyisocyanates such as tolylenediisocyanate (TDI), diphenylmethanediisocyanate (MDI), polymethylenepolyphenylisocyanate, naphthalenediisocyanate, triphenylmethanetriisocyanate, hexamethylenediisocyanate, and isophoronediisocyanate. The polyisocyanate can be modified polyisocyanates obtained by modifying said isocyanate with an active hydrogen compound such as polyhydric alcohol and amine or the other method.

The NB-unsaturated polyols can be obtained by reacting the polyisocyanate with the unsaturated active hydrogen compound. A saturated polyol is usually added. The saturated polyols can be low molecular polyols and macromolecular polyols used as the starting material for polyurethanes. The typical saturated polyols can be polyether polyols and polyester polyols and hydrocarbon polymers having terminal hydroxyl groups and are preferably polyether polyols such as polyether polyols obtained by the reaction of an alkylene oxide with an active hydrogen compound such as polyhydroxy compounds, amines and phosphoric acids and polyether polyols as cyclic ether polymers such as polyether polyols obtained by reacting an epoxide such as ethylene oxide, propylene oxide, butylene oxide, epichlorohydrin, the other alkylene oxide, styrene oxide and glycidyl ether with a polyhydric alcohol such as glycol, glycerin, trimethylolpropane, pentaerythritol, sorbitol, dexstrol etc.; or an alkanolamine such as diethanolamine, triethanolamine, and the other alkanolamines; bisphenol A, phenol-formaldehyde condensate, the other polyhydric phenol, ethylenediamine, diaminodiphenylmethane, or the other amine; and also polyether polyols such as tetrahydrofuran polymer and mixtures thereof. The desired polyether polyols have a molecular weight of 300 to 2,500 per OH group especially 600 to 2,000 per OH group and have hydroxyl groups of 2 to 4.

The saturated polyol having a molecular weight higher than that of the unsaturated AH is usually used. The macromolecular polyol has not substantially a polymerizable unsaturated group.

The polyether polyols and the polyester polyols do not substantially have a polymerizable unsaturated group if the starting material such as polyhydroxy compound and alkylene oxide has not a polymerizable unsaturated group or even though the starting material has the unsaturated group but is polymerized to be the polyol. Sometimes, an unsaturated group is formed in the polyol by a side reaction. For example, the polyether polyol obtained by the reaction of the saturated active hydrogen compound with a saturated alkylene oxide has unsaturated group at a small ratio. This is considered to form by the side reaction of the alkylene oxide especially propylene oxide adduct. In the present invention, the conventional polyether polyol having the negligible unsaturated groups can be used and referred to as the saturated polyol.

The NB-unsaturated polyols can be produced from these starting materials by various processes.

The process using the unsaturated active hydrogen compound having at least two active hydrogen groups (B) and the polyisocyanate (A) will be illustrated. The unsaturated active hydrogen compound should have hydroxyl group as the unsaturated polyhydric alcohol. For example, the NB-unsaturated diol having two hydroxyl groups can be obtained by reacting the diisocyanate with the unsaturated diol. In the process, the number of hydroxyl groups should be more than the number of the isocyanate groups. If the ratio is near 1, sometimes, a macromolecular compound is formed but the desired liquid NB-unsaturated polyol is obtained. On the other hand, the ratio of the isocyanate groups is small, the unreacted unsaturated polyhydric alcohol does not disadvantageously cause a problem. If the unsaturated polyhydric alcohol having a low molecular weight is used, a solid or viscous product is usually formed. The unsaturated polyhydric alcohol having relatively large molecular weight is preferably used.

When the unsaturated active hydrogen compound having at least two active hydrogen groups is used, the polyisocyanate and the saturated polyol are used as the starting materials, the easiest and optimum process is to react the polyisocyanate with the mixture of the unsaturated active hydrogen compound and the saturated polyol. For example, the object NB-unsaturated polyol is obtained by reacting TDI with a mixture of butenediol and polyoxyalkylenetriol. The NB-unsaturated polyol product is usually a mixture of various products which usually contain a saturated polyol. When the urethane bond-unsaturated diol is produced by using the unsaturated diol, the saturated diol and the diisocyanate as the starting materials, the production of the following urethane bond diols as simple compounds are considered:

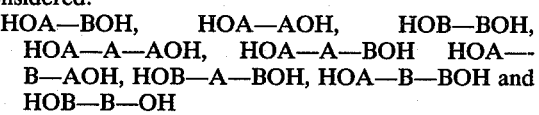

wherein A represents the unsaturated diol moiety; B represents the saturated diol moiety; and "—" represents the diisocyanate moiety and urethane bond thereof and OH represents hydroxyl group.

It is considered desirable to form products having 4 or more bonds of A and B leaving the remaining unreacted unsaturated diols and the saturated diols. The compounds having the at least unsaturated diol moiety (A) are the NB-unsaturated polyols. The complicated NB-unsaturated polyols can be obtained by using the unsaturated active hydrogen compound having 3 or more active hydrogen groups, the saturated polyol and the polyisocyanate having 3 or more isocyanate groups.

In the process using a mixture of the unsaturated AH having at least two active hydrogen groups and the saturated polyol, the amount of polyisocyanate is not critical as far as the NB-unsaturated polyol is produced. However, it is not preferable to produce highly viscous or solid form of the NB-unsaturated polyol. Therefore, high molecular weight of the NB-unsaturated polyol is not preferable and the number of the unsaturated groups in one molecule is preferably in a range of 1 to 4 especially 1 to 2. It is preferable to bond an average 0.1 to 4 especially 0.2 to 2 molecules of the unsaturated AH to 1 molecule of the saturated polyol. The polyisocyanate will bond them. It is preferable to bond more than about 1 to 4 molecules of the polyisocyanate to 1 molecule of the unsaturated AH. Therefore, it is preferable to use 0.1 to 4 mol especially 0.2 to 2 mol of the unsaturated AH; 0.1 to 4 mol especially 0.2 to 2 mol of the polyisocyanate per 1 mol of the saturated polyol. It is preferable to use more than equimol of the polyisocyanate to the unsaturated AH. It is not troublesome to have the remaining unreacted saturated polyol, and accordingly, the ratios of the unsaturated AH and the polyisocyanate to the saturated polyol can be further lowered. Both saturated polyols can be bonded to the polyisocyanate and accordingly, the molar ratio of the polyisocyanate to the unsaturated AH can be higher. The number of hydroxyl groups in the NB-unsaturated polyol is preferably more than 1.7 especially more than 2 as average per 1 molecule.

Beside the process using the mixture of the unsaturated AH and the saturated polyol, it is possible to obtain the NB-unsaturated polyol by reacting the polyisocyanate with one of the unsaturated AH or the saturated polyol to form an intermediate having isocyanate group and then reacting the remained one with the intermediate. For example, the NB-unsaturated polyol can be obtained by reacting the diisocyanate with the unsaturated diol to form an intermediate having isocyanate group and then reacting the saturated polyol with the intermediate. The NB-unsaturated polyols can be obtained by reacting these three compounds in various orders.

Various nitrogen-containing compounds are produced by reacting the polyisocyanate with a mixture of an unsaturated AH having one active hydrogen group and the saturated polyol.

One of the isocyanate groups of the polyisocyanate reacts with the one active hydrogen group of the unsaturated AH or one of hydroxyl groups of the polyol. Therefore, two or more of the isocyanate groups of the polyisocyanate can react with only the unsaturated AH or only the polyol. However, the NB-unsaturated polyol of the present invention is formed by reacting one of the isocyanate groups of the polyol with the unsaturated AH having one active hydrogen and group reacting the other isocyanate group with the polyol. For example, in the reaction of the diisocyanate with a mixture of the unsaturated monohydroxy compound having one polymerizable unsaturated group and a polyether triol, the desired NB-unsaturated polyol is produced by reacting one isocyanate group of the diisocyanate with hydroxyl groups of the unsaturated monohydroxy compound and reacting the other isocyanate group of the diisocyanate with one hydroxyl group of polyether triol to form a diol having two urethane bonds and one polymerizable unsaturated group. In accordance with this process, beside the main product, it provides a compound obtained by reacting two unsaturated monohydroxy compounds with one diisocyanate; a compound having 4 to 6 of urethane bonds and 2 to 3 of unsaturated groups obtained by reacting one isocyanate group of each diisocyanate with 2 or 3 hydroxyl groups of the polyether triol and reacting the other isocyanate group with the unsaturated monohydroxy compound; and a compound having no unsaturated group obtained by reacting the diisocyanate with only the polyether triol and the other compounds having urethane bond. The unreacted unsaturated monohydroxy compound and the unreacted polyether triol may be remained. Among them, the compound having at least two hydroxyl groups obtained by reacting the diisocyanate with the polyether triol and the unreacted polyether triol do not cause a trouble even though they remain at relatively high ratios. However, it is not suitable as the starting material for polyurethane if a large amount of the compound having no hydroxyl group or the compound having only one hydroxyl group is produced.

When the other polyol or the other polyisocyanate are used as the starting materials, it is also not preferable to produce a large amount of a compound having one or none of hydroxyl group. Therefore, the average number of hydroxyl groups of the NB-unsaturated polyol or the mixture thereof should be more than 1.7 preferably more than 2. It is preferable to use a mixture of the diol and the polyol having 3 or more hydroxyl groups or only the polyol having 3 or more hydroxyl groups in comparison with the use of only the diol as the polyol.

The ratios of the unsaturated AH having one active hydrogen group and the polyisocyanate to the saturated polyol are not critical as far as the average number of hydroxyl groups of the product is more than 1.7 especially more than 2. It is preferable to use less than 1.5 especially less than 1 molecule of the unsaturated AH having one active hydrogen group per 1 molecule of the polyol as average. The lower limit is not critical and is usually more than 0.1 especially more than 0.2 molecule of the unsaturated AH per one molecule of the polyol as average.

In the case of the polyether polyol and the unsaturated monohydroxy compound which are widely used, it is preferable to use 2 to 20 wt. parts of the unsaturated monohydroxy compound per 100 wt. parts of the polyether polyol. The polyisocyanate is used at a ratio of more than 1 mol especially 1 to 2 mol based on the unsaturated AH. The polyisocyanate can be further excess as far as the reaction product of the polyisocyanate and the polyol is adversely affected, for example to give remarkably high viscosity of the products.

The other process for producing the NB-unsaturated polyol by reacting the polyisocyanate with the unsaturated AH having one active hydrogen group and then reacting the saturated polyol with the intermediate will be illustrated.

A compound having one nitrogen-containing bond and one or more isocyanate group is produced by reacting the polyisocyanate with the unsaturated AH, and then, the object NB-unsaturated polyol can be obtained by reacting the saturated polyol with the compound having the unsaturated group and at least one isocyanate group.

The reactive product obtained by reacting the polyisocyanate with the unsaturated AH should have at least one isocyanate group. It is preferable to react more than one mol of the polyisocyanate with one mol of the unsaturated AH. The condition of excess of the polyisocyanate is not necessary as far as the reaction of the polyisocyanate with the polyol being adversely affected. However, it is not preferable to produce a large amount of a compound having no isocyanate group in the condition of excess of the unsaturated AH. In the next step of reacting the saturated polyol with the intermediate, the reaction of the isocyanate groups of the intermediate with the hydroxyl group of the polyol is performed. Therefore, one molecule of the intermediate reacts with one molecule of the polyol to form the products having hydroxyl groups (one hydroxyl group is decreased). Also the average number of hydroxyl groups of the products should be more than 1.7 especially more than 2.

In accordance with this process, the NB-unsaturated polyol having less amounts of impurities can be obtained in comparison with the former processes.

In the other embodiment, the NB-unsaturated polyol is produced by reacting the polyisocyanate with the saturated polyol and two kinds of active hydrogen compounds of the unsaturated AH having two or more active hydrogen groups and the unsaturated AH having one active hydrogen group, especially reacting the polyisocyanate with the saturated polyol and the unsaturated polyhydroxy compound and the unsaturated monohydroxy compound.

Various processes can be applied as the above-mentioned processes for example, the process for reacting the polyisocyanate with the mixture of the saturated polyol and the two kinds of unsaturated hydroxy compounds; and the process for reacting the polyisocyanate with one or both of the unsaturated hydroxy compounds, and then, reacting it with the saturated polyol.

The above-mentioned description is summerized.

The NB-unsaturated polyol used in the present invention has at least two nitrogen-containing bonds and at least one polymerizable unsaturated group and at least 1.7 of average number of hydroxyl groups. The nitrogen-containing bond is formed by the reaction of the isocyanate group with the active hydrogen group. At least two nitrogen-containing bonds are formed because of the use of the polyisocyanate. The polymerizable unsaturated group is preferably the unsaturated group in the unsaturated AH especially the unsaturated hydroxy compound. At least 1.7 of hydroxyl group per 1 molecule are hydroxyl group of the saturated polyol and/or hydroxyl group of the unsaturated polyhydroxy compound as the unsaturated AH. The unreacted hydroxyl groups of these compounds are remain as hydroxyl groups of the NB-unsaturated polyol. The number of hydroxyl groups is preferably more than 2 per one molecule. When the number of hydroxyl groups is less than 1.7, it is difficult to obtain a polymer polyol which results in a desired polyurethane. The polymerizable unsaturated group is preferably $\alpha,\beta$-unsaturated double bond at a ratio of at least preferably 1 to 2 especially 1 per one molecule. The numbers of the nitrogen-containing bond, the polymerizable unsaturated groups and hydroxyl groups are given as the numbers per one molecule. In the mixture of polyols including the NB-unsaturated polyol, the numbers of the nitrogen-containing bonds and the polymerizable unsaturated groups per one molecule can be further small.

When the structure of the NB-unsaturated polyol is considered in view of the structure of the polyisocyanate, the NB-unsaturated polyol is obtained by reacting all of isocyanate groups of the polyisocyanate with at least one of the active hydrogen group of the unsaturated AH and preferably at least one of hydroxyl group of the saturated polyol. When it is produced from only two kinds of the compounds of the unsaturated AH and the polyisocyanate, the unsaturated AH should have the unreacted hydroxyl group after the reaction. When the two kinds of the compounds and the saturated polyol are used, it is not always necessary for the unsaturated AH to have the unreacted hydroxyl group remaining after the reaction.

The NB-unsaturated polyol is preferably obtained by reacting the polyisocyanate with the unsaturated hydroxy compound and the saturated polyol, especially using both of the unsaturated polyhydroxy compound and the unsaturated monohydroxy compound as the unsaturated hydroxy compound.

The NB-unsaturated polyol is usually obtained in a form of a mixture of polyols including the NB-unsaturated polyol.

The polyol mixture, NB-saturated polyol and monool and NB-unsaturated monool and the unreacted saturated polyol, the unreacted unsaturated AH, and various other compounds. Among them, the amounts of the polyols are not critical, however amounts of the monools should not be excess and the average number of hydroxyl groups per one molecule of the polyol mixture should be at least 1.7. When the unsaturated AH has an active hydrogen group except hydroxyl group, for example, carboxylic acid group, it is not preferable to retain such active hydrogen group except hydroxyl group in view of the trouble in the following production of the polyurethane. Therefore, the unsaturated AH is preferably the unsaturated hydroxy compound. The mixture of polyols including the NB-unsaturated polyol can be diluted with the other polyol such as the saturated polyol.

The number of the polymerizable unsaturated group in the polyol mixture including the NB-unsaturated polyol is preferably more than 0.1 per 1 molecule. The upper limit is not critical and preferably upto 4 per 1 molecule and the number is preferably in a range of 0.2 to 2 per 1 molecule. The nitrogen-containing bonds are usually two or more per one unsaturated group. Therefore, an average number of the nitrogen-containing bonds is preferably more than 0.2 especially more than 0.4 per 1 molecule of polyol in the polyol mixture. The upper limit is not critical but preferably upto 4. The upper limitation is not severely considered as the unsaturated group. The number of hydroxyl groups in the mixture of the polyols should be more than 1.7 especially more than 2 per 1 molecule of polyol.

In the process for reacting the polyisocyanate with the unsaturated AH especially the unsaturated hydroxy compound and the saturated polyol, or the process for reacting the polyisocyanate with one of the unsaturated AH or the saturated polyol, and then, reacting the remainder with the intermediate, to produce the NB-unsaturated polyol or the polyol mixture, the amounts of the starting materials are preferably selected in the following ranges. It is preferable to use 0.1 to 0.4 mol especially 0.2 to 2.0 mol of the unsaturated AH per 1 mol of the saturated polyol. When the unsaturated polyhydroxy compound and the unsaturated monohydroxy compound is used as the unsaturated AH, the ratio of the polyhydroxy compound to the monohydroxy compound is preferably 1/3 to 10/1 especially 1/2 to 8/1. The ratio of the polyisocyanate is more than equimol especially 1 to 2 mol especially 1 to 1.5 mol per 1 mol of the unsaturated AH. The upper limit of the polyisocyanate can be greater. However, the ratio may be limited in view of the viscosity of the product. The viscosity of the product is increased depending upon the amount of the polyisocyanate. The product having high viscosity causes various troubles such as defective mixing etc. in the next polymerization step or the step of production of the polyurethane foam from the resulting polymer polyol. The amount of the polyisocyanate is preferably controlled to give the viscosity of the product of less than 20,000 cp at 25° C. especially less than 10,000 cp at 25° C. if it is used without any dilution. When the product is diluted with a polyol in the case of high viscosity or the other reason, the ratio of the product in the diluted polyol composition is preferably more than 10 wt.%.

One of the advantage of the present invention is to easily produce the unsaturated polyol. In the conventional process for producing the unsaturated polyether ester polyol, described in the prior art, by reacting maleic acid with a polyol and further reacting it with propyleneoxide, it is necessary to react them at about 100° C. in the presence of a catalyst. Therefore, it is necessary to remove the catalyst after the reaction. Moreover, it is necessary to use a special reactor such as an autoclave and to carry out a post treatment such as a stripping after the reaction. On the contrary, the reaction can be performed at a temperature from the ambient temperature to 100° C. without a special reactor or a catalyst. Usually, the object unsaturated polyol can be obtained by mixing the starting materials. Moreover, it is unnecessary to carry out a special post treatment. The unsaturated polyol can be used for the next polymerization.

In the process of the present invention, the NB-unsaturated polyol obtained by using the unsaturated AH having one active hydrogen group especially the unsaturated monohydroxy compound is easily copolymerized with a monomer whereby a stable polymer polyol is obtained. For example, when the unsaturated monohydroxy compound is bonded through the polyisocyanate to one hydroxyl group of the saturated polyol, the unsaturated group is placed at the terminal of the saturated polyol. That is, hydroxyl group of polyether triol is at the terminal of the polyether chain. In the NB-unsaturated diol obtained by bonding this hydroxyl group through the diisocyanate to hydroxyl group of the unsaturated monool having a low molecular weight, the unsaturated group is placed at the terminal of the polyether chain. The terminal unsaturated group is considered to be easily copolymerizable with a monomer. On the other hand, in the unsaturated polyether ester polyol described in the prior art, the unsaturated group is placed at the middle part of the polyether chain whereby the unsaturated group in the polyether is considered not to be easily copolymerized with a monomer.

The use of the unsaturated AH having one active hydrogen group makes it easy to attain the copolymerization of the resulting NB-unsaturated polyol and a monomer. However, the compound results in a reduction of the number of hydroxyl groups of the saturated polyol. Therefore, when the NB-unsaturated polyol having a relatively large number of the unsaturated group or the mixture thereof is required, or the number of hydroxyl groups of the saturated polyol is small, it is difficult to introduce the unsaturated group by said compound. Therefore, it is preferable to use both of the unsaturated AH having one active hydrogen group and the unsaturated AH having 2 or more active hydrogen groups and it is especially preferable to use both of the unsaturated monohydroxy compound and the unsaturated polyhydroxy compound.

The monomers having a polymerizable unsaturated group can be monomers having one polymerizable double bond though it is not critical to use such monomers. Suitable monomers include acrylonitrile, styrene, acrylamide, acrylic acid esters, methacrylic acid esters and vinyl acetates. It is not critical to use them. It is also possible to use styrene derivatives such as α-methylstyrene, dimethylstyrene, halostyrenes; olefins such as butadiene, and isoprene; acryl derivatives such as methacrylonitrile, butyl acrylate and benzyl methacrylate; unsaturated aliphatic acid esters such as vinyl halides such as vinyl chloride; maleic acid diesters; itaconic acid diesters etc. Only one of these monomers can be used. The monomer can be used with the other monomer to produce a copolymer. The most preferable monomer is acrylonitrile styrene, a combination of acrylonitrile and styrene or other combinations of the other monomer and acrylonitrile or styrene as the main component.

In order to carry out the graft polymerization of the monomer with the NB-unsaturated polyol, it is usual to require a polymerization initiator. Sometimes, it is possible to attain the graft polymerization by heat or radiation without using any polymerization initiator. The polymerization initiator can be the initiator for initaiting the polymerization by forming free radical.

Suitable polymerization initiators include azobisisobutyronitrile, benzoylperoxide, diisopropylperoxydicarbonate, acetylperoxide, di-t-butylperoxide, dicumylperoxide, dilauroylperoxide and persulfate. It is especially preferable to use azobisisobutyronitrile.

The polymerization is usually carried out at higher than the decomposition temperature especially 80° to 160° C. The amount of the monomer is preferably less than 60 wt.% especially about 10 to 50 wt.% based on the total of the polyols including the NB-unsaturated polyol. The polymer polyol obtained by the polymerization can be used as the starting material for polyurethane without any purification, though it is preferable to treat the reaction mixture by a post-treatment such as the separation of impurities such as decomposed materials of the polymerization initiator.

The advantage of the polymer polyol of the present invention is to have high dispersion stability. The dispersion stability of the polymer polyol obtained by using the conventional saturated polyol is not satisfactory. It has been necessary to use acrylonitrile for high dispersion stability as one of the monomer components.

More than half or all of the monomer should be acrylonitrile to obtain a desired polymer polyol.

In the process for producing the polymer polyol by using the conventional unsaturated polyol, it is substantially indispensable to use acrylonitrile.

In the process of the present invention, acrylonitrile can be used as the monomer. Thus, the polymer polyol having high dispersion stability can be obtained without using acrylonitrile as the monomer. For example, the polymer polyol having high dispersion stability can be obtained by using only styrene.

The polymer polyol of the present invention is usually the opaque dispersion. The polymer polyol obtained by using styrene is the white dispersion. The polymer polyol obtained by using acrylonitrile is the colored dispersion. It is possible to obtain a semitransparent polymer polyol depending upon the conditions of the reactions. As the starting material for polyurethane, it is unnecessary to be the transparent polymer polyol, but it can be the dispersion.

The polymer polyol obtained by the process of the present invention can be used as the starting material for polyurethane by itself or by the combination of the active hydrogen compound used for polyurethane such as the other polyol. The active hydrogen compounds used with the polymer polyol of the invention are preferably polyhydroxy compounds having at least 2 of hydroxyl groups such as polyether polyols and polyester polyols, especially polyether polyols.

Suitable polyether polyols include polyether polyols obtained by reacting an alkylene oxide with a polyhydric alcohol or an amine as the initiator or the saturated polyols such as tetrahydrofuran polymer.

The polyol components as the polymer polyol of the present invention or the mixture thereof can be admixed with an additive such as a catalyst, a foam regulating agent, a blowing agent, a filler, a crosslinking agent, a chain extender, a stabilizer, a coloring agent and the other additives.

In the process for producing a polyurethane foam, it is usual to incorporate a catalyst, a blowing agent and a foam regulating agent as the indispensable additives.

The catalyst can be preferably amine catalysts such as tertiary amines or organometallic compounds such as organotin compounds. The blowing agents can be preferably water, trichlorofluoromethane, methylene chloride and the other halohydrocarbons. The foam regulating agents can be preferably organosilicone surfactants.

The other starting material for polyurethane is the polyisocyanate. The polyurethane can be obtained by reacting the polyols with the polyisocyanate. The polyurethane can be produced by the conventional one-shot process or the conventional prepolymer process. The polyurethane is usually a polyurethane foam. The polyurethane foam having high elasticity can be obtained by using the polymer polyol of the present invention. The polyurethane foam is suitable for foams for energy absorption and foams for a sheet of automobile etc.

The advantage of the polyurethane foam obtained by using the polymer polyol is to provide the foam having hardness higher than that of the polyurethane foam obtained by using the conventional polymer polyol. The hard polyurethane foam has superior physical characteristic in the use for energy absorption. That is, the deformation is small when high stress is applied to the foam for energy absorption. Moreover, since the nitrogen-containing bonds are included, the reaction velocity for producing the polyurethane is improved and the amount of the amine catalyst can be reduced.

The present invention will be further illustrated by certain examples and references which are provided for purposes of illustration only and are not intended to be limiting the present invention.

The saturated polyols used in Preparations and Examples and the unsaturated polyols and the polyisocyanates and the catalysts used in Examples and References are as follows.

Polyol A: poly(oxypropylene-oxyethylene) triol having a molecular weight of 5,000 and OH value of 34.2 mg.KOH/g.

Polyol B: polyoxypropylene triol having a molecular weight of 3,000 and OH value of 56.0 mg.KOH/g.

Polyol C: polyoxypropylenediol having a molecular weight of 2,000 and OH value of 56.2 mg.KOH/g.

Polyol D: mixture (50:50) of polyol A and Polyol A-maleic acid reaction product (molar ratio of 1:1)

TDI-80: mixture (80:20) of 2.4-tolylenediisocyanate and 2,6-tolylenediisocyanate MDI: 4,4′-diphenylmethane diisocyanate AIBN: azobisisobutyronitrile Polyol E: mixture (50:50) of polyol obtained in Reference 1 and Polyol A Preparations 1 to 6:

Preparation of NB-unsaturated polyols:

The process for producing NB-unsaturated polyols used in the process of the present invention and the results of the production are described.

In a 5 liter autoclave, each polyol, each unsaturated polyhydric alcohol and each diisocyanate shown in Table 1 were charged and the mixture was heated at 80° C. for about 7 hours. In all processes, each transparent slightly viscous liquid was obtained. It was confirmed that unreacted isocyanate group did not remain by the infrared spectrum. The products were used as the starting materials for the production of polymer polyols.

TABLE 1

| | Production of NB-unsaturated polyol: | | | | | |
|---|---|---|---|---|---|---|
| | Prep. 1 | Prep. 2 | Prep. 3 | Prep. 4 | Prep. 5 | Prep. 6 |
| Kind of polyol | Polyol A | Polyol A | Polyol B | Polyol A | Polyol A | Polyol C |
| Amount of polyol (g.) | 4,000 | 4,000 | 4,000 | 4,000 | 4,000 | 4,000 |
| Kind of unsaturated polyol | 3-butene-1,2-diol | ← | ← | 2-butene-1,4-diol | ← | ← |
| Amount of unsaturated polyol (g.) | 70 | 35 | 120 | 70 | 35 | 170 |
| Kind of diisocyanate | TDI-80 | ← | ← | ← | MDI | TDI-80 |
| Amount of diisocyanate (g.) | 140 | 70 | 235 | 140 | 100 | 350 |
| Analysis OH value (mg.KOH/g.) | 33.9 | 34.3 | 54.5 | 34.1 | 33.6 | 55.6 |
| Viscosity (cp at 25° C.) | 5,900 | 2,100 | 1,750 | 6,100 | 2,500 | 1,250 |

EXAMPLES 1 TO 7

REFERENCES 1 AND 2

Production of polymer polyols

The processes for producing the polymer polyols of the invention and the results thereof are described.

In a 5 liter autoclave, each of the NB-unsaturated polyols obtained by using the compounds shown in Table 1 or each of the polyoxyalkylene polyol shown in Table 2 was charged and the autoclave was purged by repeating suction and nitrogen feeding at the specific temperature. Each mixture of the remained NB-unsaturated polyol or the polyoxyalkylene polyol, and each of the monomers having the polymerizable unsaturated group, and the polymerization initiator shown in Table 2 was fed into the autoclave at a specific rate with stirring. The unreacted monomer was removed under a reduced pressure to obtain the object polymer polyols.

When the polyoxyalkylene polyol was used as the polyol and styrene was used as the monomer, as the reference a phase separation was caused and a uniform dispersion could not be obtained.

The process using an unsaturated polyol obtained by reacting maleic acid with polyoxyalkylene polyol was also carried out as the reference.

TABLE 2

Result of production of polymer polyols:

| Kind of polyol | Exp. 1 Prep. 1 | Exp. 2 Prep. 2 | Exp. 3 Prep. 4 | Ref. 1 Polyol A | Ref. 2 Polyol D | Exp. 4 Prep. 2 | Exp. 5 Polyol E | Exp. 6 Prep. 3 | Exp. 7 Prep. 5 | Exp. 8 Prep. 6 |
|---|---|---|---|---|---|---|---|---|---|---|
| Initial amount of polyol (g.) | 400 | ← | ← | ← | ← | 600 | 400 | ← | ← | ← |
| Polyol (g.) | 2,800 | ← | ← | ← | ← | 2,600 | 2,800 | ← | ← | ← |
| Acrylonitrile (g.) | 600 | ← | 0 | ← | ← | ← | 600 | 400 | 0 | 400 |
| Styrene (g.) | 200 | ← | 800 | ← | ← | ← | 200 | 400 | 800 | 400 |
| AIBN (g.) | 30 | ← | 40 | ← | ← | ← | 30 | ← | 40 | ← |
| Reaction temp. (°C.) | 100 | ← | 110 | ← | ← | ← | 100 | ← | 110 | ← |
| Dispersibility | good | good | good | separation | good | good | good | good | good | good |
| Appearance of polymers polyol | pale yellow | pale yellow | white | white | white | white | pale yellow | pale yellow | white | white |
| Analysis OH value (mg. KOH/g.) | 27.8 | 28.3 | 28.1 | 29.5 | 28.5 | 28.5 | 27.9 | 44.2 | 44.6 | 44.7 |
| Viscosity (cp at 25° C.) | 13,300 | 5,400 | 12,100 | — | 4,200 | 4,100 | 4,500 | 3,300 | 3,600 | 2,900 |

EXAMPLES 9 TO 10 AND REFERENCE 3

Blowing test for soft foam

Each soft polyurethane foam was produced by using each of the polymer polyols obtained in Examples 5 and 6 in Table 2.

As the reference, the use of only polyoxypropylene triol having a molecular weight of 3,000 (Polyol B) as the polyol is also shown.

In each test, 100 g. of each of the polymer polyols or the polyol, 1.2 g. of Silicone L 520, 0.3 g. of a mixture (1:3) of triethylenediamine and dipropyleneglycol (DABCO 33 LV), 0.3 g. of stannous octylate (T-9), 4.0 g. of water and TDI-80 (tolylenediisocyanate) to give an index of 105 were mixed and the mixture was stirred to result each blowing. The results are shown in Table 3.

In comparison with Reference 3, the physical characteristics especially ILD of the polyurethane foams obtained in Examples 5 and 6 are superior.

TABLE 3

Result of physical characteristics of soft polyurethane foam:

| | Example 9 | Example 10 | Reference 3 |
|---|---|---|---|
| Polymer polyol | Exp. 5 | Exp. 6 | none |
| Polyol | — | — | Polyol B |
| Density (kg./m³) | 26.5 | 26.3 | 26.2 |
| Tensile strength (kg./cm²) | 1.42 | 1.43 | 1.36 |
| Elongation (%) | 171 | 170 | 175 |
| Tear strength (kg./cm) | 0.85 | 0.87 | 0.81 |
| ILD 25% kg/314 cm | 13.1 | 12.9 | 9.5 |
| 65% | 30.1 | 28.4 | 20.9 |
| Sag factor | 2.3 | 2.2 | 2.2 |
| Repulsive elasticity (%) | 46 | 44 | 41 |
| Commpressive permanent strain (%) (50%) | 3.6 | 3.7 | 4.5 |

EXAMPLES 11 TO 13 REFERENCES 4 AND 5

Blowing test for high elasticity polyurethane foam

Each mold blowing test of high elasticity polyurethane foam was carried out by using each of the polymer polyols obtained in Examples 1, 2 and 3 and Reference 2 in Table 2.

As the reference, polyoxypropyleneethylenetriol having a molecular weight of 5,000 (Polyol A) was used for the mold blowing test.

In each test, 160 g. of each of the polymer polyol (Polyol A in Reference 4), 240 g. of each of the polyols, 4.4 g. of Silicone L 5305, 2.4 g. of DABCO 33 LV, 12 g. of water and a mixture of isocyanates (80:20) of TDI-80 and PAPI 135 (crude phenylenediisocyanate manufactured by Kasei-Upjon Co.) to give an index of 105, were mixed and the mixture was charged into a mold made of aluminum (400 mm × 400 mm × 100 mm) at 50° C. and it was maintained at room temperature for 10 minutes. The resulting polyurethane foam was taken out from the mold. The physical characteristics of the polyurethane foams are shown in Table 4.

In comparison with Reference 4, the physical characteristics especially ILD of the polyurethane foams obtained in Examples 11 to 13 were superior. In Reference 5, the reaction velocity was lower than those of Examples. The product was maintained for 15 minutes, since it could not be demolded after 10 minutes at room temperature. The characteristics of ILD and the compression permanent strain were inferior to those of the Examples.

TABLE 4

Result of physical characteristics of high elasticity polyurethane foam:

| | Exp. 11 | Exp. 12 | Exp. 13 | Ref. 4 | Ref. 5 |
|---|---|---|---|---|---|
| Polymer polyol | Exp. 1 | Exp. 2 | Exp. 3 | none | Ref. 2 |
| Polyol | — | — | — | polyol A | — |

TABLE 4-continued

Result of physical characteristics of high elasticity polyurethane foam:

|  | Exp. 11 | Exp. 12 | Exp. 13 | Ref. 4 | Ref. 5 |
|---|---|---|---|---|---|
| Density (kg./m$^3$) | 49.2 | 48.9 | 49.1 | 49.0 | 48.9 |
| Tensile strength (kg./cm$^2$) | 1.31 | 1.28 | 1.33 | 1.26 | 1.27 |
| Elongation (%) | 166 | 167 | 165 | 170 | 169 |
| Tear strength (kg./cm) | 0.83 | 0.81 | 0.82 | 0.77 | 0.81 |
| ILD 25% kg/314 cm | 18.3 | 18.6 | 17.9 | 12.5 | 17.0 |
| 65% | 53.1 | 53.9 | 53.7 | 35.0 | 49.9 |
| Sag factor | 2.9 | 2.9 | 3.0 | 2.8 | 2.9 |
| Repulsive elasticity (%) | 59 | 61 | 60 | 58 | 57 |
| Compressive permanent strain (%) (50%) | 6.8 | 6.8 | 6.7 | 6.6 | 7.5 |

REFERENCES 7 TO 8

EXAMPLES 14 TO 15

Production of NB-unsaturated polyols and polymer polyols (Unsaturated polyhydroxy compounds)

In accordance with the process of Preparations 1 to 6 except using the different unsaturated polyhydric alcohols, the following NB-unsaturated polyols were produced.

TABLE 5

|  | Prep. 7 | Prep. 8 |
|---|---|---|
| Kind of polyol | Polyol A | Polyol A |
| Amount of polyol (g.) | 4,000 | 4,000 |
| Kind of unsaturated polyhydric alcohol | glycerin mono-acrylate | pentaerythritol mono-vinyl ether |
| Amount of unsaturated polyhydric alcohol (g.) | 116 | 162 |
| Kind of diisocyanate | TDI-80 | TDI-80 |
| Amount of diisocyanate (g.) | 140 | 210 |
| Analysis OH value (mg.KOH/g.) | 34.2 | 35.3 |
| Viscosity (cp at 25° C.) | 6,400 | 7,150 |

In accordance with the process of Examples 1 to 7 except using the unsaturated polyols, polymer polyols were produced. The results are shown in Table 6. As the results of Examples 1 to 7, excellent polymer polyols were produced.

TABLE 6

| Kind of polyol | Exp. 14 Prep. 7 | Exp. 15 Prep. 8 |
|---|---|---|
| Initial amount of polyol (g.) | 400 | ← |
| Polyol (g.) | 2,800 | ← |
| Acrylonitrile (g.) | 0 | 400 |
| Styrene (g.) | 800 | 400 |
| AZBN (g.) | 40 | ← |
| Reaction temp. (°C.) | 100 | ← |
| Dispersibility | good | good |
| Appearance of polymer polyol | white | white |
| Analysis OH value (mg. KOH/g.) | 26.9 | 28.4 |
| Viscosity (cp at 25° C.) | 13,500 | 18,400 |

Preparations 9 to 14:

Preparations of NB-unsubstituted polyols: using unsaturated monohydroxy compound:

The process for producing NB-unsaturated polyols used in the process of the present invention and the results of the production are described.

In a 5 liter autoclave, each polyol, each unsaturated active hydrogen compound and each diisocyanate were charged and the mixture was heated at 80° C. for about 4 hours. In all processes, each transparent slightly viscous liquid was obtained. It was confirmed that unreacted isocyanate group did not remain by the infrared spectrum. The products were used as the stirring materials for the production of polymer polyols.

TABLE 7

|  | Prep. 9 | Prep. 10 | Prep. 11 | Prep. 12 | Prep. 13 | Prep. 14 |
|---|---|---|---|---|---|---|
| Kind of polyol | Polyol A | ← | ← | Polyol B | Polyol A | Polyol C |
| Initial amount of polyol (g.) | 4,000 | ← | ← | ← | ← | ← |
| Kind of unsaturated active hydrogen compound | 2-hydroxy ethyl acrylate | ← | 2-hydroxy methyl methacrylate | ← | p-hydroxy α-methyl styrene | ← |
| Amount of unsaturated active hydrogen compound (g.) | 90 | 45 | 31 | 50 | 53 | 83 |
| Kind of diisocyanate | TDI-80 | ← | ← | ← | MDI | TDI-80 |
| Amount of diisocyanate (g.) | 140 | 70 | 42 | 70 | 100 | 108 |
| Analysis OH value (mg.KOH/g.) | 22.4 | 28.1 | 30.3 | 50.5 | 27.7 | 47.7 |
| Viscosity (cp at 25° C.) | 5,500 | 2,750 | 1,830 | 1,540 | 2,390 | 1,030 |

EXAMPLES 16 TO 24
REFERENCES 6 TO 7

The process for producing the polymer polyols of the invention and the results thereof are described.

In a 5 liter autoclave, each of the NB-unsaturated polyols obtained by using the compounds shown in Table 7 or each of the polyoxyalkylene polyol shown in Table 8 was charged, and the autoclave was purged by repeating suction and nitrogen feeding at the specific temperature. Each mixture of the remained NB-unsaturated polyol or the polyoxyalkylene polyol and each of the monomer having the polymerizable unsaturated group and the polymerization initiator shown in Table 8 was fed into the autoclave at a specific rate with stirring. The unreacted monomer was removed under a reduced pressure to obtain the object polymer polyols.

When the polyoxyalkylene polyol was used as the polyol and styrene was used as the monomer, as the reference, a phase separation was caused and a uniform dispersion could not be obtained.

The process using an unsaturated polyol obtained by reacting maleic acid with polyoxyalkylene polyol was also carried out as the reference. The appearance was a white dispersion, but the particles of the dispersion were rough.

In comparison with Reference 3, physical characteristics especially ILD of the polyurethane foams obtained in Examples 25 and 26 are superior.

TABLE 9

|  | Exp. 25 | Exp. 26 |
|---|---|---|
| Polymer polyol | Exp. 21 | Exp. 22 |
| Density (kg./m$^3$) | 25.9 | 26.1 |
| Tensile strength (kg./cm$^2$) | 1.39 | 1.40 |
| Elongation (%) | 172 | 169 |
| Tear strength (kg./cm) | 0.83 | 0.81 |
| ILD  25% kg/314 cm | 13.3 | 12.8 |
|       65% | 30.6 | 28.2 |
| Sag factor | 2.3 | 2.2 |
| Repulsive elasticity (%) | 44 | 46 |
| Compressive permanent strain (%) (50%) | 3.7 | 3.6 |

EXAMPLES 27 TO 29

Each mold blowing test of high elasticity polyurethane foam was carried out by using each of the polymer polyols obtained in Examples 16, 17 and 18 in Table 8.

In each test, 160 g. of each of the polymer polyol, 240 g. of each of the polyols, 4.4 g. of Silicone L 5305, 2.4 g. of DABCO 33LV, 12 g. of water and a mixture of iso-

TABLE 8

|  | Exp. 16 | Exp. 17 | Exp. 18 | Ref. 6 | Ref. 7 | Exp. 19 | Exp. 20 | Exp 21 | Exp 22 | Exp 23 | Exp 24 |
|---|---|---|---|---|---|---|---|---|---|---|---|
| Kind of polyol | Polyol F | Prep. 10 | Prep. 11 | Polyol A | Polyol D | Prep. 10 | Polyol F | Prep. 12 | Prep 12 | Prep. 13 | Prep. 14 |
| Initial amount of polyol (g.) | 400 | ← | ← | ← | ← | 600 | 400 | ← | ← | ← | ← |
| Polyol (g.) | 2,800 | ← | ← | ← | ← | 2,600 | 2,800 | ← | ← | ← | ← |
| Acrylonitrile (g.) | 640 | ← | 0 | ← | ← | ← | 600 | 400 | 0 | ← | 200 |
| Styrene (g.) | 160 | ← | 800 | ← | ← | ← | 200 | 400 | 800 | ← | 600 |
| AIBN (g.) | 25 | ← | 40 | ← | ← | ← | 30 | ← | 40 | ← | ← |
| Reaction temp. (°C.) | 120 | 100 | 110 | ← | ← | ← | 100 | ← | 110 | ← | ← |
| Dispersibility | good | good | good | separation | rough | good | good | good | good | good | good |
| Appearance of polymer polyol | pale yellow | pale yellow | white | white | white | white | pale yellow | white | white | white | white |
| Analysis OH value (mg.KOH/g.) | 22.9 | 23.5 | 24.5 | 30.1 | 24.2 | 23.3 | 23.4 | 40.4 | 39.9 | 23.8 | 38.1 |
| Viscosity (cp at 25° C.) | 12,200 | 6,950 | 3,620 | — | 4,610 | 5,370 | 11,100 | 3,020 | 3,460 | 4,980 | 2,960 |

EXAMPLES 25 TO 26

Each soft polyurethane foam was produced by using each of the polymer polyols obtained in Examples 21 and 22 in Table 8.

In each test, 100 g. of each of the polymer polyols or the polyol, 1.2 g. of silicone L 520, 0.3 g. of a mixture (1:3) of triethylenediamine and dipropyleneglycol (DABCO 33LV), 0.3 g. of stannous octylate (T-9), 4.0 g. of water and TDI-80 (tolylenediisocyanate) to give an index of 105 were mixed and the mixture was stirred to result each blowing. The results are shown in Table 9.

cyanates (80:20) of TDI-80 and PAPI 135 (crude phenylenediisocyanate manufactured by Kasei-Upjon Co.) to give an index of 105, were mixed and the mixture was charged into a mold made of aluminum (400 mm×400 mm×100 mm) at 50° C. and was maintained it at room temperature for 10 minutes. The resulting polyurethane foam was taken out from the mold. The physical characteristics of the polyurethane foams are shown in Table 10.

In comparison with Reference 4, the physical characteristics especially ILD of the polyurethane foams obtained in Examples 16, 17 and 18 were superior.

TABLE 10

|  | Exp. 27 | Exp. 28 | Exp. 29 |
|---|---|---|---|
| Polymer polyol | Exp. 16 | Exp. 17 | Exp. 18 |
| Density (kg./m$^3$) | 49.1 | 49.2 | 48.9 |
| Tensile strength (kg./cm$^2$) | 1.28 | 1.31 | 1.33 |
| Elongation (%) | 167 | 165 | 163 |
| Tear strength (kg./cm) | 0.79 | 0.80 | 0.81 |
| ILD 25% kg/314 cm | 18.9 | 18.2 | 17.8 |
| 65% | 54.8 | 52.8 | 53.4 |
| Sag factor | 2.9 | 2.9 | 3.0 |
| Repulsive elasticity (%) | 61 | 60 | 60 |
| Commpressive permanent strain (%) (50%) | 6.6 | 6.9 | 6.7 |

Preparations 15 to 18

Preparation of NB-unsaturated polyols

The process for producing NB-unsaturated polyols used in the process of the present invention and the results of the production are described.

In a 5 liter autoclave, each polyol, each unsaturated polyhydric alcohol and each diisocyanate shown in Table 11 were charged and the mixture was heated at 80° C. for 5 hours.

In all processes, each transparent slightly viscous liquid was obtained. It was confirmed that the unreacted isocyanate group was not remained by the infrared spectrum. The products were used as the starting materials for the production of polymer polyols.

EXAMPLES 30 TO 38
REFERENCES 8 AND 9

The processes for producing the polymer polyols of the invention and the results thereof are described.

In a 5 liter autoclave, each of the NB-unsaturated polyols obtained by using the compounds shown in Table 11 or each of the polyoxyalkylene polyol shown in Table 12 was charged, and the autoclave was purged by repeating suction and nitrogen feeding at the specific temperature. Each mixture of the remained NB-unsaturated polyol or the polyoxyalkylene polyol and each of the monomer having the polymerizable unsaturated group, and the polymerization initiator shown in Table 12 was fed into the autoclave at a specific rate with stirring. The unreacted monomer was removed under a reduced pressure to obtain the object polymer polyols.

When the polyalkylene polyol was used as the polyol and styrene was used as the monomer as the reference (Reference 8), a phase separation was caused and a uniformed dispersion could not be obtained.

The process using an unsaturated polyol obtained by reacting maleic acid with polyoxyalkylene polyol was also carried out as the reference (Reference 9). The particles of the resulting dispersion were rough. When only the unsaturated polyhydroxy compound was used as Examples 33 and 34 or only small amount of the

TABLE 11

|  | Prep. 15 | Prep. 16 | Prep. 17 | Prep. 18 | Prep. 19 | Prep. 20 | Prep. 21 | Prep. 22 |
|---|---|---|---|---|---|---|---|---|
| Polyol Kind | Polyol A | ← | ← | ← | ← | Polyol B | ← | ← |
| Amount (mol) | 1 | ← | ← | ← | ← | 1 | ← | ← |
| Unsaturated polyhydroxy compound Kind | 3-butene-1,2-diol | none | 3-butene-1,2-diol | 2,5-dimethyl-3-hexane-2,5-diol | 2-butene-1,4-diol | 3-butene-1,2-diol | none | 3-butene-1,2-diol |
| Amount (mol) | 0.6 |  | 0.8 | 0.3 | 0.6 | 0.5 |  | 0.7 |
| Unsaturated monohydroxy compound Kind | 2-hydroxy ethyl acrylate | ← | none | 2-hydroxy ethyl acrylate | 2-hydroxy ethyl methacrylate | 2-hydroxy ethyl acrylate | ← | none |
| Amount (mol) | 0.2 | 0.8 |  | 0.2 | 0.3 | 0.2 | 0.2 |  |
| Diisocyanate Kind | TDI-80 | ← | ← | ← | ← | TDI-80 | ← | ← |
| Amount (mol) | 0.8 | 0.8 | 0.8 | 0.5 | 0.9 | 0.7 | 0.2 | 0.7 |
| Analysis OH value (mg. KOH/g.) | 31.4 | 24.7 | 34.2 | 30.9 | 30.1 | 52.3 | 52.1 | 56.1 |
| Viscosity (cp at 25° C.) | 4,800 | 4,650 | 4,710 | 3,390 | 7,120 | 2,980 | 1,630 | 3,040 | unsaturated monohydroxy compound was incorporated in the polymerization using styrene as the monomer, the particles of the resulting dispersions were relatively rough.

TABLE 12

|  | Exp. 30 | Exp. 31 | Exp. 32 | Ref. 8 | Ref. 9 | Exp. 33 | Exp. 34 | Exp. 35 | Exp. 36 | Exp. 37 | Exp. 38 |
|---|---|---|---|---|---|---|---|---|---|---|---|
| Kind of polyol | Prep. 15 | Prep. 15 | Prep. 18 | Polyol A | Polyol D | Prep. 17 | Prep. 22 | Prep. 19 | Prep. 20 | Prep. 20 | Prep. 21 |
| Initial amount of polyol (g.) | 400 | ← | ← | ← | ← | ← | ← | 600 | ← | ← | 400 |
| Polyol (g.) | 2,800 | ← | ← | ← | ← | ← | ← | 2,600 | ← | ← | 2,800 |

TABLE 12-continued

|  | Exp. 30 | Exp. 31 | Exp. 32 | Ref. 8 | Ref. 9 | Exp. 33 | Exp. 34 | Exp. 35 | Exp. 36 | Exp. 37 | Exp. 38 |
|---|---|---|---|---|---|---|---|---|---|---|---|
| Acrylonitrile (g.) | 400 | 0 | 500 | 0 | ← | ← | ← | 400 | ← | 0 | ← |
| Styrene (g.) | 400 | 800 | 300 | 800 | ← | ← | ← | 400 | ← | 800 | ← |
| AIBN (g.) | 40 | 30 | ← | ← | ← | ← | ← | 40 | ← | ← | 30 |
| Reaction temp. (°C.) | 100 | 110 | 100 | 110 | ← | ← | ← | 100 | ← | ← | 110 |
| Dispersibility | good | good | good | separation | rough | slight rough | ← | good | good | good | slight rough |
| Appearance of polymer polyol | pale yellow | white | pale yellow | white | ← | ← | ← | pale yellow | ← | white | ← |
| Analysis OH value (mg. KOH/g.) | 25.1 | 25.5 | 24.9 | — | 24.6 | 27.3 | 44.8 | 24.7 | 41.8 | 41.9 | 42.2 |
| Viscosity (cp at 25° C.) | 8,930 | 9,110 | 6,420 | — | 4,130 | 9,340 | 6,280 | 14,370 | 5,920 | 6,010 | 3,330 |

Dispersibility: comparison of particles of dispersions in this Table.

EXAMPLES 39 TO 40

Each soft polyurethane foam was produced by using each of the polymer polyols obtained in Examples 36 and 37 in Table 12.

In each test, 100 g. of each of the polymer polyols, 1.2 g. of Silicone L 520, 0.3 g. of DABCO 33LV. (1:3 of triethylenediamine and dipropyleneglycol), 0.3 g. of stannous octylate (T-9), 4.0 g. of water and TDI-80 (tolylenediisocyanate) to give an index of 105 were mixed and the mixture was stirred to result each blowing. The results are shown in Table 13.

In comparison with Reference 3, the physical characteristics especially ILD of the polyurethane foams obtained in Examples 39 and 40 are superior.

TABLE 13

|  | Exp. 39 | Exp. 40 |
|---|---|---|
| Polymer polyol | Exp. 36 | Exp. 37 |
| Density (kg./m³) | 26.4 | 26.1 |
| Tensile strength (kg.cm²) | 1.39 | 1.40 |
| Elongation (%) | 168 | 169 |
| Tear strength (kg./cm) | 0.83 | 0.81 |
| ILD 25% kg/314 cm | 12.8 | 12.7 |
| 65% | | |
| Sag factor | 2.2 | 2.1 |
| Repulsive elasticity (%) | 43 | 44 |
| Compressive permanent strain (%) (50%) | 3.7 | 3.6 |

EXAMPLES 41 TO 43

Each mold blowing test of high elasticity polyurethane foam was carried out by using each of the polymer polyols obtained in Examples 30, 31 and 32 in Table 12.

In each test, 160 g. of each of the polymer polyol, 240 g. of each of the polyols, 4.4 g. of Silicone L 5305, 2.4 g. of DABCO 33LV, 12 g. of water and a mixture of isocyanates (80:20) of TDI-80 and PAPI 135 (crude phenylenediisocyanate manufactured by Kasei-Upjon Co.) to give an index of 105, were mixed and the mixture was charged into a mold made of aluminum (400 mm × 400 mm × 10 mm) at 50° C. and was maintained it at room temperature for 10 minutes. The resulting polyurethane foam was taken out from the mold. The physical characteristics of the polyurethane foams are shown in Table 14.

In comparison with Reference 4, the physical characteristics especially ILD of the polyurethane foams obtained in Examples 30, 31 and 32 were superior.

TABLE 14

|  | Exp. 41 | Exp. 42 | Exp. 43 |
|---|---|---|---|
| Polymer polyol | Exp. 30 | Exp. 31 | Exp. 32 |
| Density (kg./m³) | 49.1 | 48.8 | 48.7 |
| Tensile strength (kg./cm²) | 1.27 | 1.29 | 1.35 |
| Elongation (%) | 179 | 162 | 166 |
| Tear strength (kg./cm) | 0.78 | 0.81 | 0.80 |
| ILD 25% kg/314 cm | 18.5 | 17.9 | 18.6 |
| 65% | 51.8 | 51.9 | 53.9 |
| Sag factor | 2.8 | 2.9 | 2.9 |
| Repulsive elasticity (%) | 63 | 61 | 64 |
| Commmpressive permanent strain (%) (50%) | 6.6 | 6.4 | 6.9 |

We claim:

1. A process for producing a polymer polyol which comprises polymerizing a monomer having a polymerizable unsaturated group in a nitrogen bond-containing unsaturated polyol or polyol mixture and said nitrogen bond-containing unsaturated polyol having at least two nitrogen-containing bonds formed by reacting organic isocyanate groups with active hydrogen groups, at least one polymerizable unsaturated group and at least 1.7 hydroxyl groups, as average.

2. The process according to claim 1 wherein said polyol mixture including said unsaturated polyol has at least 0.2 nitrogen-containing bonds and at least 0.1 polymerizable unsaturated groups and at least 1.7 hydroxyl groups as average per 1 molecule of said polyol.

3. The process according to claim 1 wherein said unsaturated polyol is obtained by reacting a substantially saturated polyol having at least two hydroxyl groups, an unsaturated active hydrogen compound having at least one active hydrogen group and at least one polymerizable unsaturated group and a polyisocyanate having at least two isocyanate groups.

4. The process according to claim 3 wherein said unsaturated polyol is obtained by reacting all of the isocyanate groups of said polyisocyanate with at least one hydroxy group of said substantially saturated polyol and at least one active hydrogen group of said unsaturated active hydrogen compound.

5. The process according to claim 3 or 4 wherein said substantially saturated polyol is a polyether polyol.

6. The process according to claim 3 or 4 wherein said unsaturated active hydrogen compound is an unsaturated polyhydroxy compound.

7. The process according to claim 3 or 4 wherein said unsaturated active hydrogen compound is an unsaturated monohydroxy compound.

8. The process according to claim 3 or 4 wherein said polyisocyanate is an aromatic polyisocyanate.

9. The process according to claim 1 wherein said monomer is a vinyl monomer.

10. The process according to claim 9 wherein said vinyl monomer is selected from the group consisting of acrylonitrile, styrene and mixtures thereof.

11. A polyurethane made of a polyisocyanate with a polymer polyol obtained by the process of claim 1.

12. The polyurethane according to claim 11 which is a polyurethane foam obtained by reacting said polyisocyanate with said polymer polyol in the presence of a blowing agent.

13. A process for producing a polymer polyol which comprises polymerizing a monomer having a polymerizable unsaturated group in a nitrogen bond-containing unsaturated polyol or polyol mixture having at least 1.7 hydroxyl groups as average obtained by reacting an organic polyisocyanate with a mixture of a substantially saturated polyol having at least 2 hydroxyl groups and an unsaturated active hydrogen compound having at least one active hydrogen group and and at least one polymerizable unsaturated group or by reacting said polyisocyanate with either of said substantially saturated polyol or said unsaturated active hydrogen compound to form an intermediate, and then reacting the remainder with the intermediate; or a polyol mixture obtained by diluting said unsaturated polyol or polyol mixture with a substantially saturated polyol.

14. The process according to claim 13 wherein 1 mol of said substantially saturated polyol and 0.1 to 4 moles of said unsaturated active hydrogen compound and 0.1 to 4 moles of said polyisocyanate at a molar ratio of more than 1 of said polyisocyanate to said unsaturated active hydrogen compound are used in the production of said unsaturated polyol or polyol mixture.

15. The process according to claim 14 wherein 1 mol of said substantially saturated polyol and 0.2 to 2 moles of said unsaturated active hydrogen compound and 0.1 to 2 moles of said polyisocyanate at a molar ratio of said polyisocyanate to said unsaturated active hydrogen compound of 1 to 2 are used in the production of said unsaturated polyol or polyol mixture.

16. The process according to claim 13 wherein the viscosity of said unsaturated polyol or polyol mixture having at least 1.7 hydroxyl groups as average is less than 20,000 cp at 25° C.

17. The process according to claim 13 wherein said substantially saturated polyol is a polyether polyol.

18. The process according to claim 13 wherein said unsaturated active hydrogen compound is an unsaturated polyhydroxy compound.

19. The process according to claim 13 wherein said unsaturated active hydrogen compound is an unsaturated monohydroxy compound.

20. The process according to claim 13 wherein said unsaturated active hydrogen compound is a mixture of an unsaturated polyhydroxy compound and an unsaturated monohydroxy compound.

21. The process according to claim 13 wherein said polyisocyanate is an aromatic polyisocyanate.

22. The process according to claim 13 wherein said monomer is a vinyl monomer.

23. The process according to claim 22 wherein said vinyl monomer is selected from the group consisting of acrylonitrile, styrene and mixtures thereof.

24. A polyurethane made of a polyisocyanate with a polymer polyol obtained by the process of claim 13.

25. The polyurethane according to claim 24 which is a polyurethane foam obtained by reacting said polyisocyanate with said polymer polyol in the presence of a blowing agent.

* * * * *